United States Patent
Saxton et al.

(10) Patent No.: US 9,027,186 B2
(45) Date of Patent: May 12, 2015

(54) SNOW REMOVAL APPARATUS AND RELATED METHODS

(71) Applicant: Quirky, Inc., New York, NY (US)

(72) Inventors: Aaron Saxton, New York, NY (US);
Laura Sink, New York, NY (US);
Nicholas Oxley, New York, NY (US)

(73) Assignee: Quirky, Inc., New York, NY (US)

( * ) Notice: Subject to any disclaimer, the term of this patent is extended or adjusted under 35 U.S.C. 154(b) by 0 days.

(21) Appl. No.: 14/192,657

(22) Filed: Feb. 27, 2014

(65) Prior Publication Data

US 2014/0237729 A1    Aug. 28, 2014

Related U.S. Application Data

(60) Provisional application No. 61/769,877, filed on Feb. 27, 2013.

(51) Int. Cl.
*A01B 1/00*    (2006.01)
*B25F 1/02*    (2006.01)

(52) U.S. Cl.
CPC ........................ *B25F 1/02* (2013.01)

(58) Field of Classification Search
USPC .............................................. 7/116
See application file for complete search history.

(56) References Cited

U.S. PATENT DOCUMENTS

| | | | | |
|---|---|---|---|---|
| 887,614 | A * | 5/1908 | Thompson | 16/87.4 R |
| 1,177,072 | A * | 3/1916 | Warman | 294/57 |
| 1,922,998 | A * | 8/1933 | Williams | 15/111 |
| 1,930,000 | A * | 10/1933 | Bulger | 294/57 |
| 4,993,768 | A * | 2/1991 | Ewen | 294/51 |
| 5,727,829 | A * | 3/1998 | Bellichak | 294/51 |
| 7,347,468 | B1 * | 3/2008 | Tidcomb | 294/51 |
| 2007/0085359 | A1 * | 4/2007 | Schouten | 294/51 |
| 2012/0176780 | A1 * | 7/2012 | Gross et al. | 362/184 |

FOREIGN PATENT DOCUMENTS

| | | |
|---|---|---|
| CN | 202051182 | 11/2011 |
| DE | 20003727 | 7/2006 |
| DE | 202006011175 | 9/2006 |
| JP | 2008163688 | 7/2008 |

OTHER PUBLICATIONS

Rabota na vysote—osveschenie, PETZL International 2012 [online] [retrieved on May 23, 2014] Retrieved from the Internet—<URL:http/petzl.com/catalogue/Petzl-catalog-pro-2012-RU.pdf.> p. 149.

* cited by examiner

*Primary Examiner* — Hadi Shakeri
*Assistant Examiner* — Danny Hong
(74) *Attorney, Agent, or Firm* — Cowan, Liebowitz & Latman, P.C.; Steven D. Underwood

(57)    ABSTRACT

An exemplary aspect comprises an apparatus comprising: a brush component comprising a handle on a first end of a shaft and a brush on a second end of the shaft; and a shovel component removably connected to the brush component; wherein the brush is at least partially enclosed within the shovel component when the shovel component is connected to the brush component, and wherein the brush is exposed when the shovel component is disconnected from the brush component.

10 Claims, 24 Drawing Sheets

SNOW REMOVAL APPARATUS AND RELATED METHODS

CROSS-REFERENCE TO RELATED APPLICATIONS

This application claims priority under 35 U.S.C. 119(e) to U.S. Provisional Patent Application No. 61/769,877, filed Feb. 27, 2013, entitled "Snow Removal Apparatus and Related Methods." The entire contents of the above-referenced application are incorporated herein by reference.

INTRODUCTION

An exemplary apparatus embodiment comprises a shovel, brush, and flashlight combined into one compact design. A user may extend the handle to form a full-sized shovel, or pop the handle out completely to use a snow brush. The ergonomic handle of an exemplary embodiment contains a flashlight (for example, an LED flashlight), which may serve as either a light source or emergency beacon. The LED flashlight may have two settings: white light for visibility, and blinking red light for an emergency beacon. An exemplary embodiment is collapsible for compact storage.

An exemplary aspect comprises an apparatus comprising: a brush component comprising a handle on a first end of a shaft and a brush on a second end of the shaft; and a shovel component removably connected to the brush component; wherein the brush is at least partially enclosed within the shovel component when the shovel component is connected to the brush component, and wherein the brush is exposed when the shovel component is disconnected from the brush component.

In one or more exemplary apparatus embodiments: (1) the handle comprises one or more reflectors; (2) the handle comprises one or more flashlights; (3) at least one of the one or more flashlights is removable; (4) at least one of the one or more flashlights has a first mode in which a white light is activated, and a second mode in which a blinking red light is activated; (5) the shaft has four convex sides; (6) the shovel component comprises an opening configured to accept the shaft on three sides, and configured on a fourth side to accept the brush; (7) the shaft comprises two or more collapsible components; and (8) the shovel component is removably connected to the brush component via one or more button pins.

Another exemplary aspect may comprise a method of operating an apparatus, comprising: disconnecting the brush component from the shovel component; removing snow or ice using the brush; and reconnecting the brush component to the shovel component.

In one or more exemplary method embodiments: the shovel component connected to the brush component is used to remove snow or ice.

Further aspects, details, and embodiments will be apparent from the drawings and the description below.

BRIEF DESCRIPTION OF THE DRAWINGS

FIG. 8 shows an exemplary apparatus embodiment being removed from storage, in a collapsed form.

FIG. 9 shows an exemplary apparatus embodiment being used as a shovel, to remove snow from underneath a vehicle.

FIG. 10 shows an exemplary apparatus embodiment being used as a scraper, to remove ice or snow from a vehicle windshield.

FIG. 11 shows an exemplary apparatus embodiment being used (with the brush removed from the shovel head) as a snow brush on a vehicle.

FIG. 12 shows an exemplary apparatus embodiment with a removable flashlight component being removed from the handle.

FIG. 13 shows an exemplary apparatus embodiment being used as a hazard warning device.

DETAILED DESCRIPTION OF CERTAIN EXEMPLARY EMBODIMENTS

Figure 1:
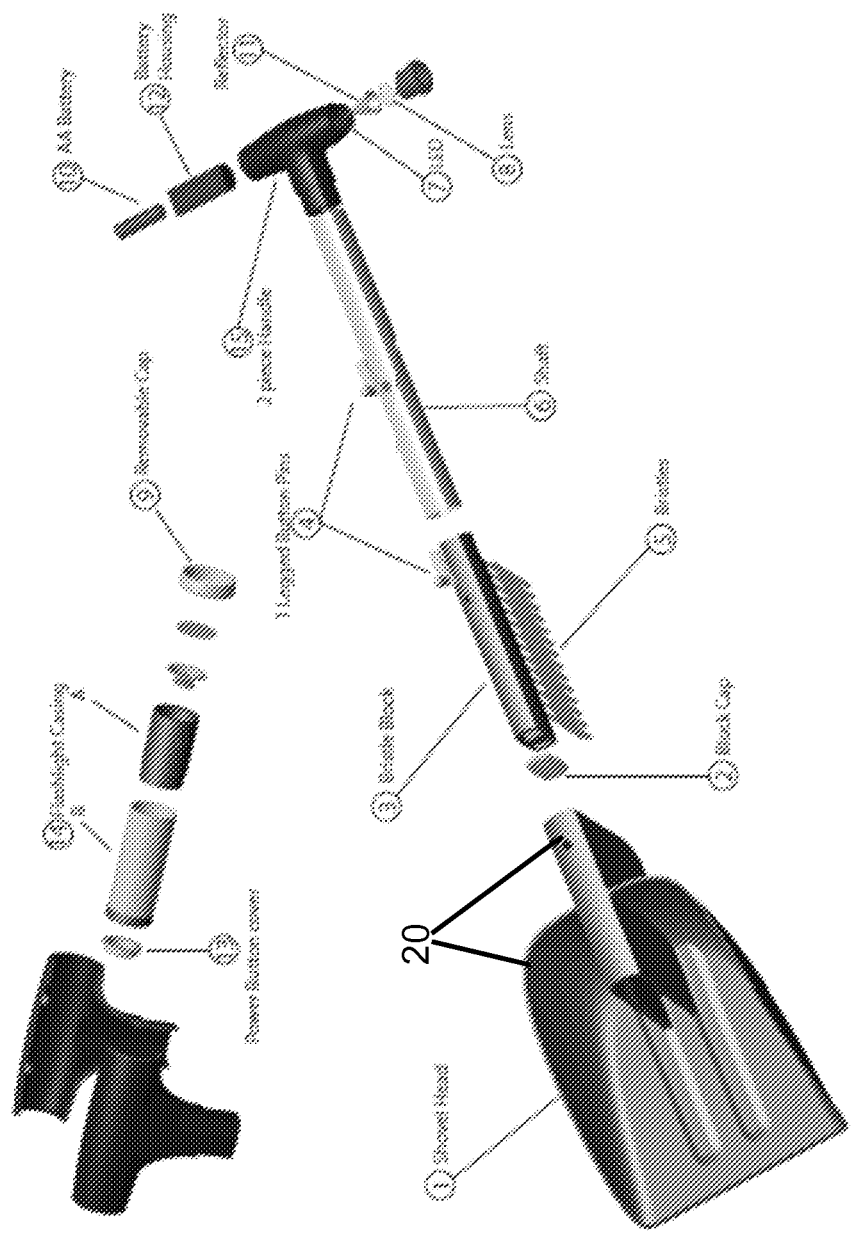
FIGS. 1 and 2 depict an exemplary apparatus embodiment.
Figure 2:
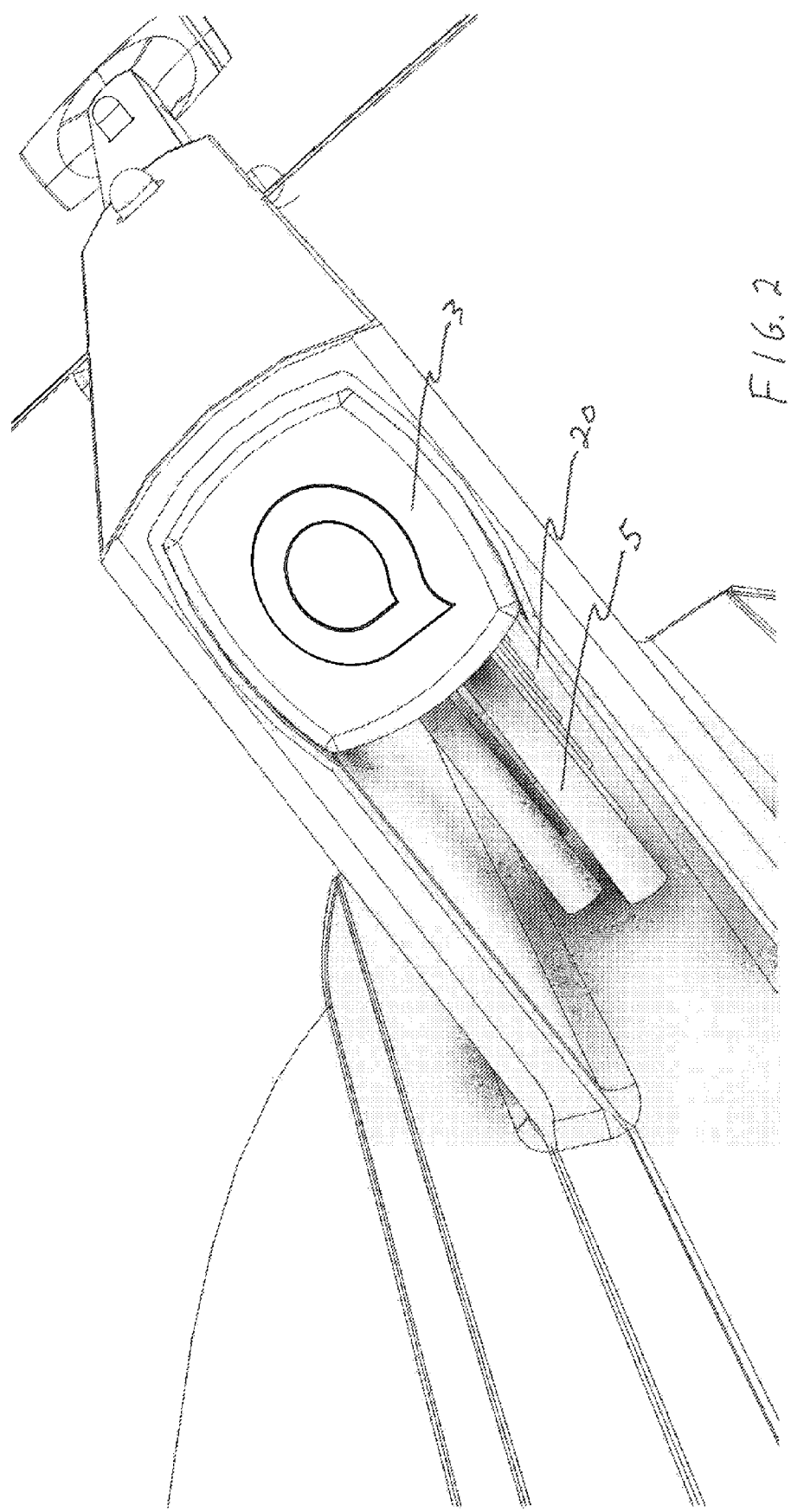

An exemplary apparatus embodiment is depicted in FIG. 1. In this exemplary embodiment, a shovel head (1) comprises an opening 20 that accepts a bristle block shaft (3). In an exemplary embodiment, the opening 20 is configured as shown in FIG. 2, wherein shaft (3) has four convex sides, and an upper portion of opening 20 has the same shape (on three sides) as shaft (3), to enable shaft (3) to fit securely into opening 20, while a lower portion of opening 20 is rectangular (on three sides), and configured to accept brush bristles (5) attached to bristle block shaft (3). Bristle block shaft (3) may be secured in opening 20 via one or more legged button pins (4). A block cap (2) may be affixed to the shovel end of bristle block shaft (3). Alternatively, the bristle block may be one piece—with no separate cap.

A second shaft (6) may be inserted into bristle block shaft (3), and secured, in an extended position, with one or more legged button pins (4). Shaft (6) may be fully inserted into bristle block shaft (3) in order to make the apparatus more compact, for storage.

A handle (15) may be provided on one end of shaft (6). In the exemplary embodiment depicted in FIG. 1, handle (15) is a two-piece handle, and further comprises an (LED) flashlight component. The flashlight component may comprise an LED (7), a lens (8), a reflector (11), a battery (10) (e.g., a AA battery), and a battery housing (12). The flashlight component also may comprise a power button cover (13), a flashlight casing (14) comprising an A component and a B component (see FIG. 1), and a removable cap (9).

Exemplary materials for the above-described components are listed in the Table below. As those skilled in the art will understand, these materials are listed as examples only, and any suitable materials may be used without departing from the scope of the aspects and embodiments described herein.

TABLE

| PART | EXEMPLARY MATERIAL |
|---|---|
| Shovel head (1) | Polycarbonate (PC) - Black MT 11006 |
| Block cap (2) | Polypropylene (PP) or PC - Teal MT 11006 |
| Bristle block shaft (3) | PC - Black MT11006 |
| Legged Button Pins (4) | Spring steel |

TABLE-continued

| PART | EXEMPLARY MATERIAL |
| --- | --- |
| Bristles (5) | Nylon |
| Shaft (6) | Aluminum or Stainless Steel |
| Removable cap (9) | PP - Teal MT11006 |
| Power button cover (13) | Thermoplastic elastomer (TPE) |
| Flashlight casing (14) | A: PP - Textured; B: PP = Matte |
| Handle (15) | PP - MT11006 |

Figure 3:
FIG. 3 illustrates several exemplary features of embodiments.

Additional details of exemplary apparatus embodiments are depicted in FIG. 3, which illustrates (310) that the removable handle doubles as a brush and that an LED flashlight in the handle also may be removable; (320) that the apparatus may be collapsed into a compact form for easy storage; and (330) that the apparatus may comprise a wide shovel.

Figure 4:
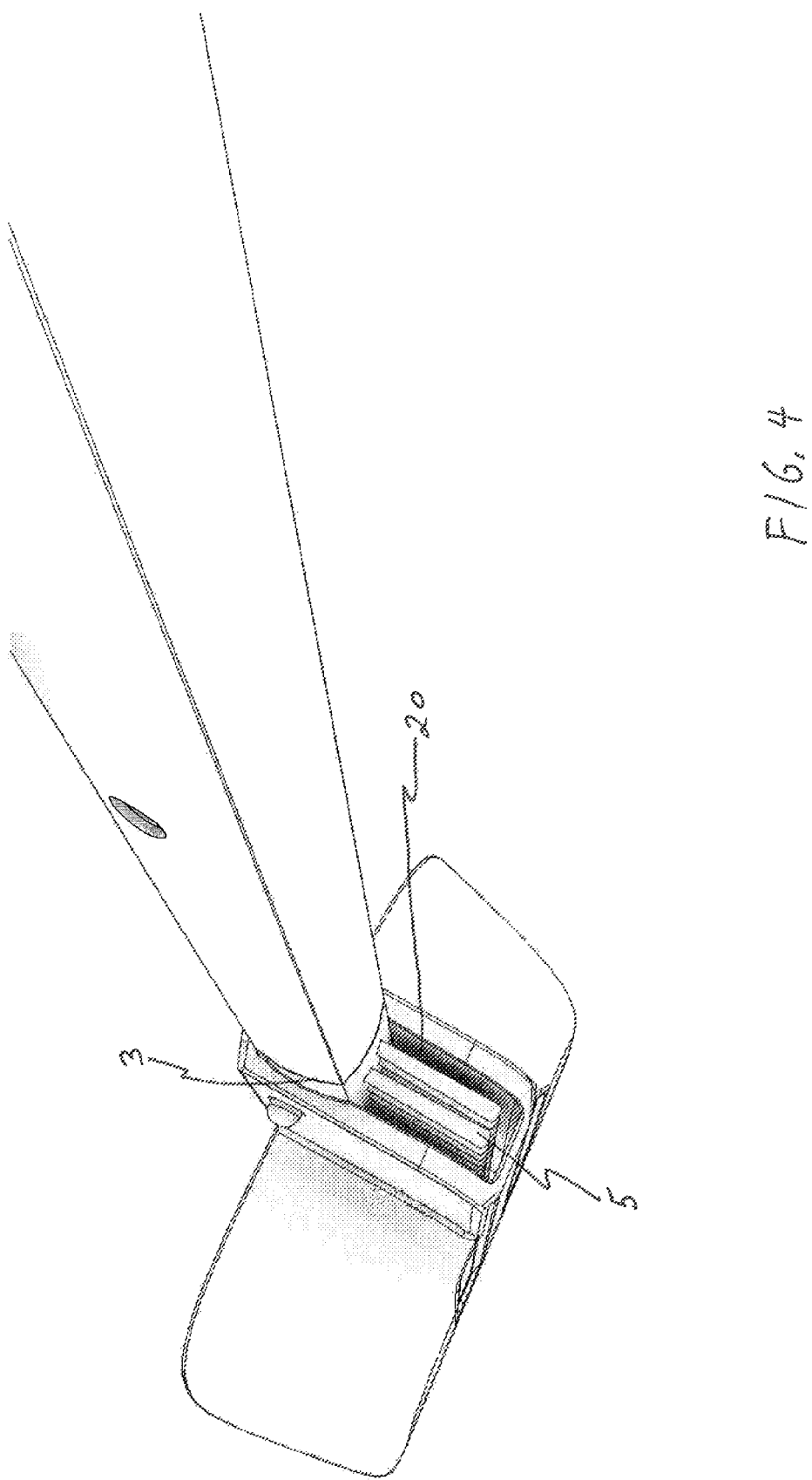
FIG. 4 depicts a user-side view of an exemplary embodiment.

FIG. 4 depicts a user-side view of bristles (5), opening 20, and bristle block shaft (3) of an exemplary embodiment.

Figure 5:
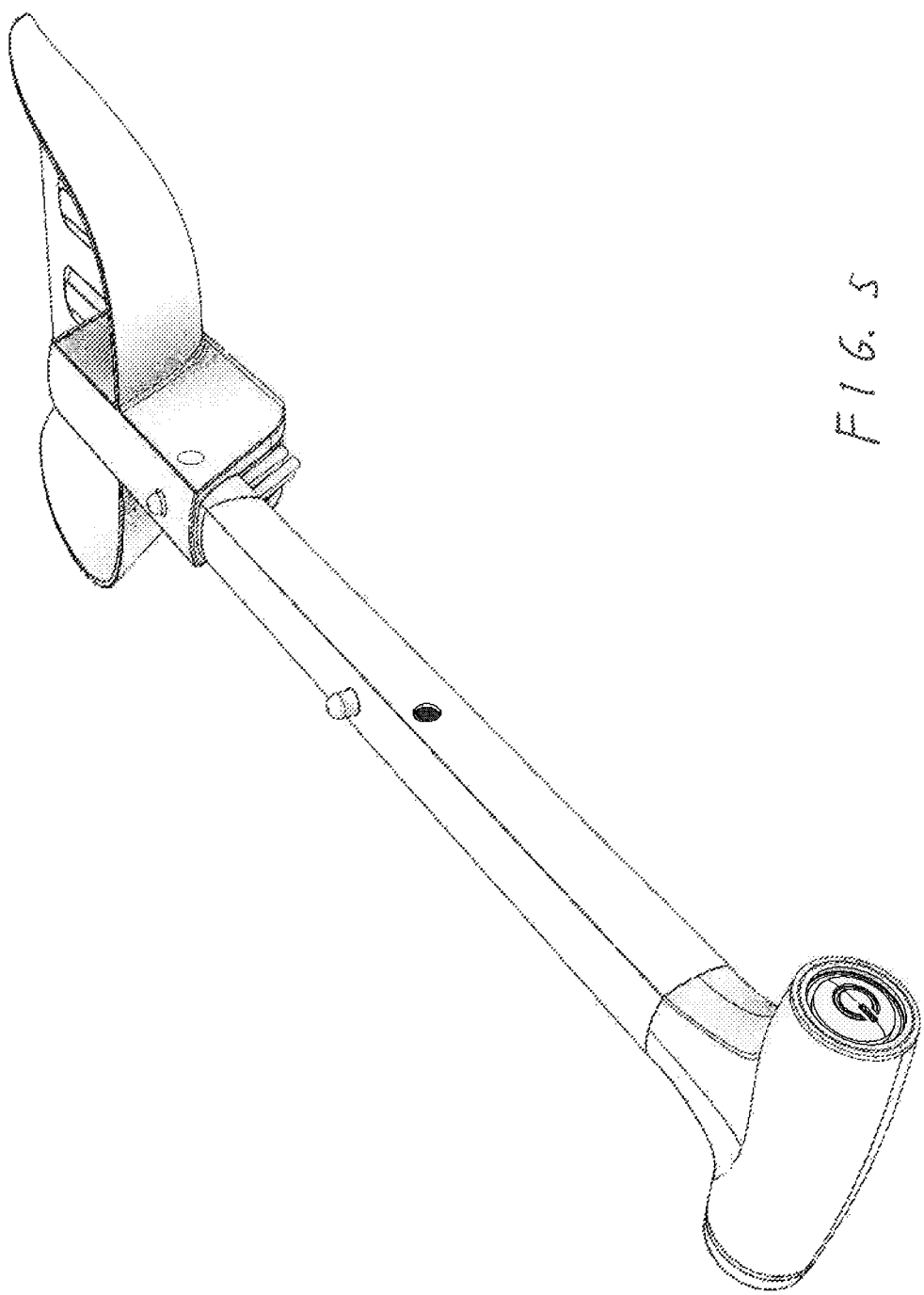
FIGS. 5-7 depict additional views of exemplary embodiments.
Figure 6:
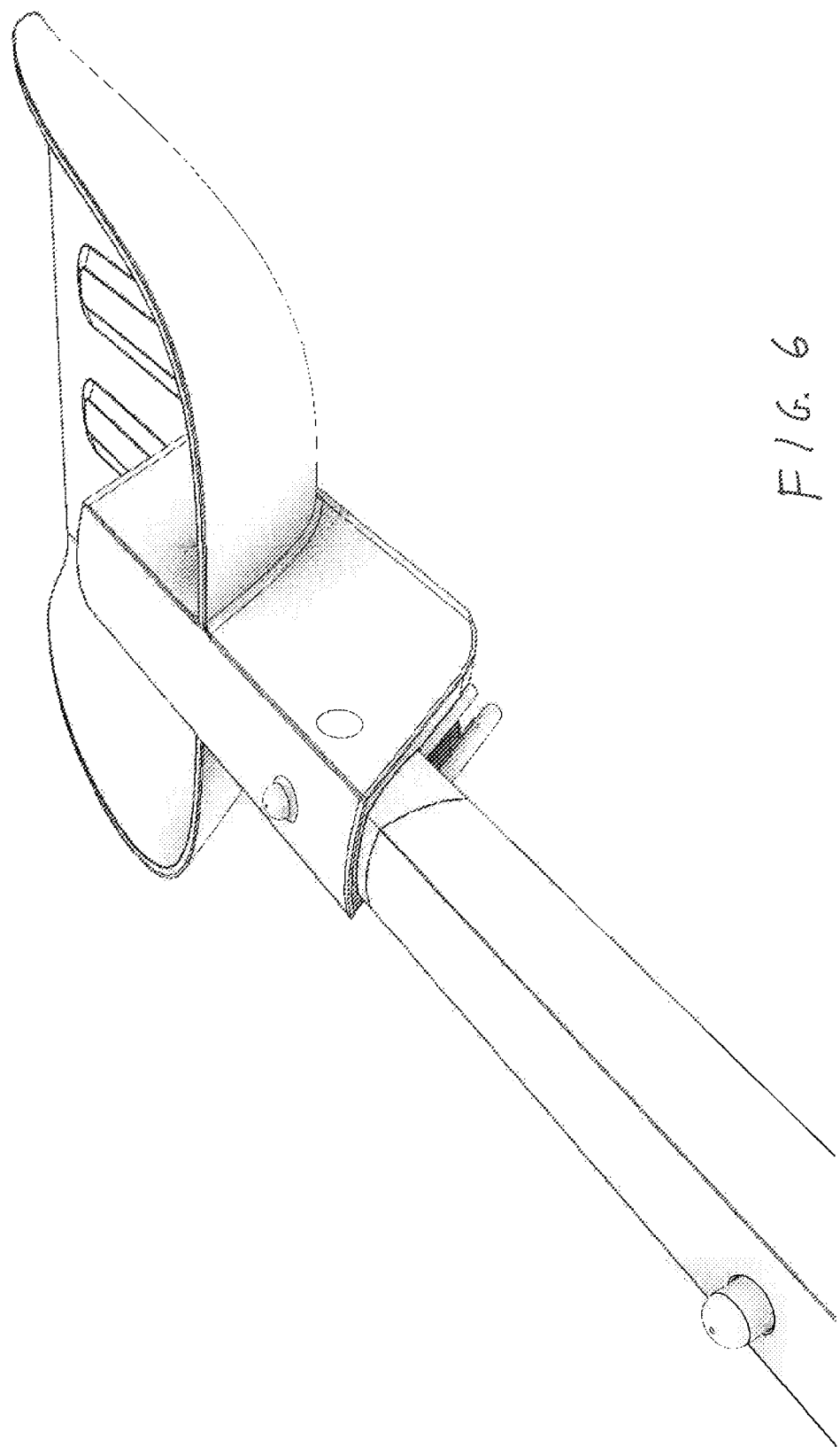
Figure 7:
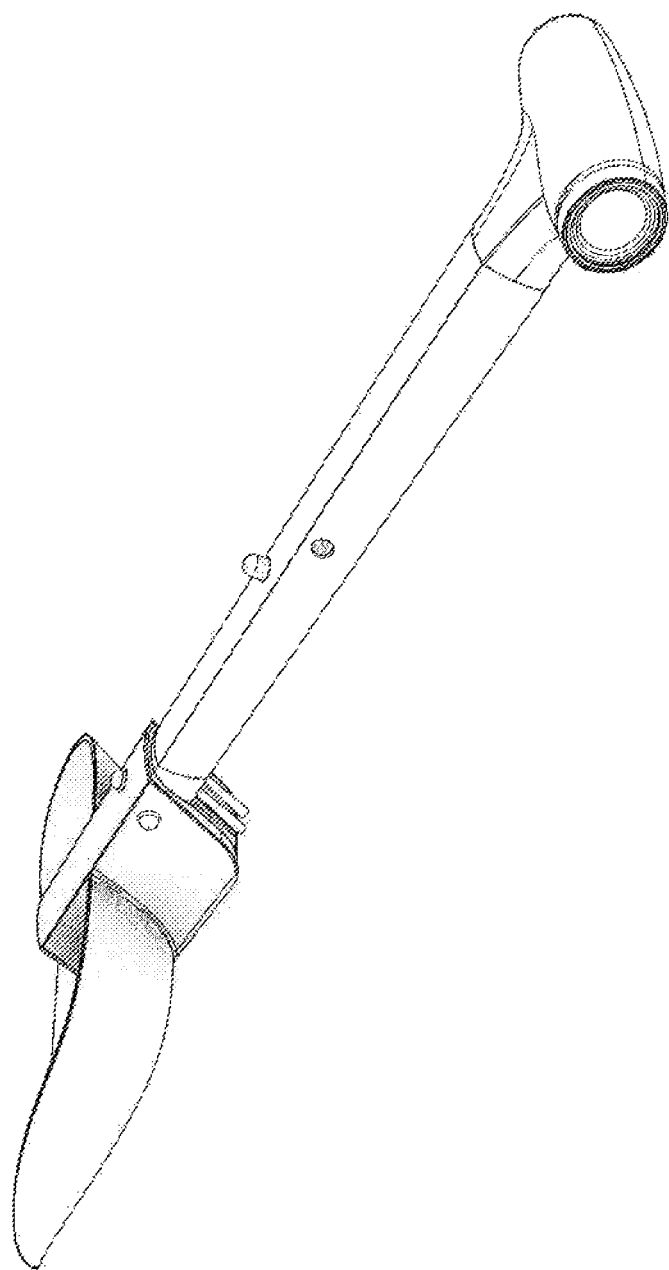

FIGS. 5-7 depict additional views of exemplary embodiments.

FIGS. 8-13 depict exemplary usage of one or more exemplary embodiments.

Figure 8:
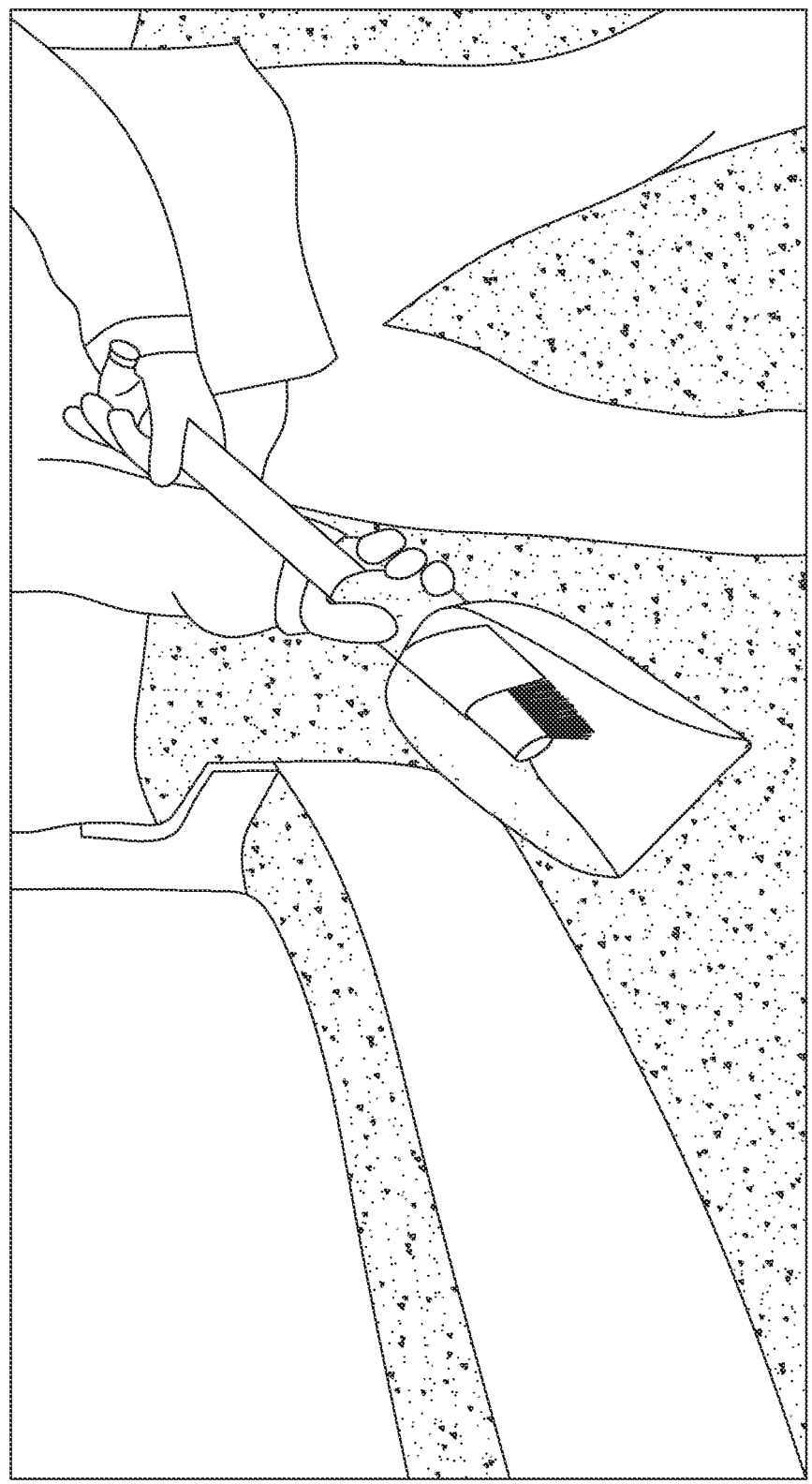
FIGS. 8-13 depict exemplary usage of one or more exemplary embodiments.

FIG. 8 shows an exemplary apparatus embodiment being removed from storage, in a collapsed form.

Figure 9:
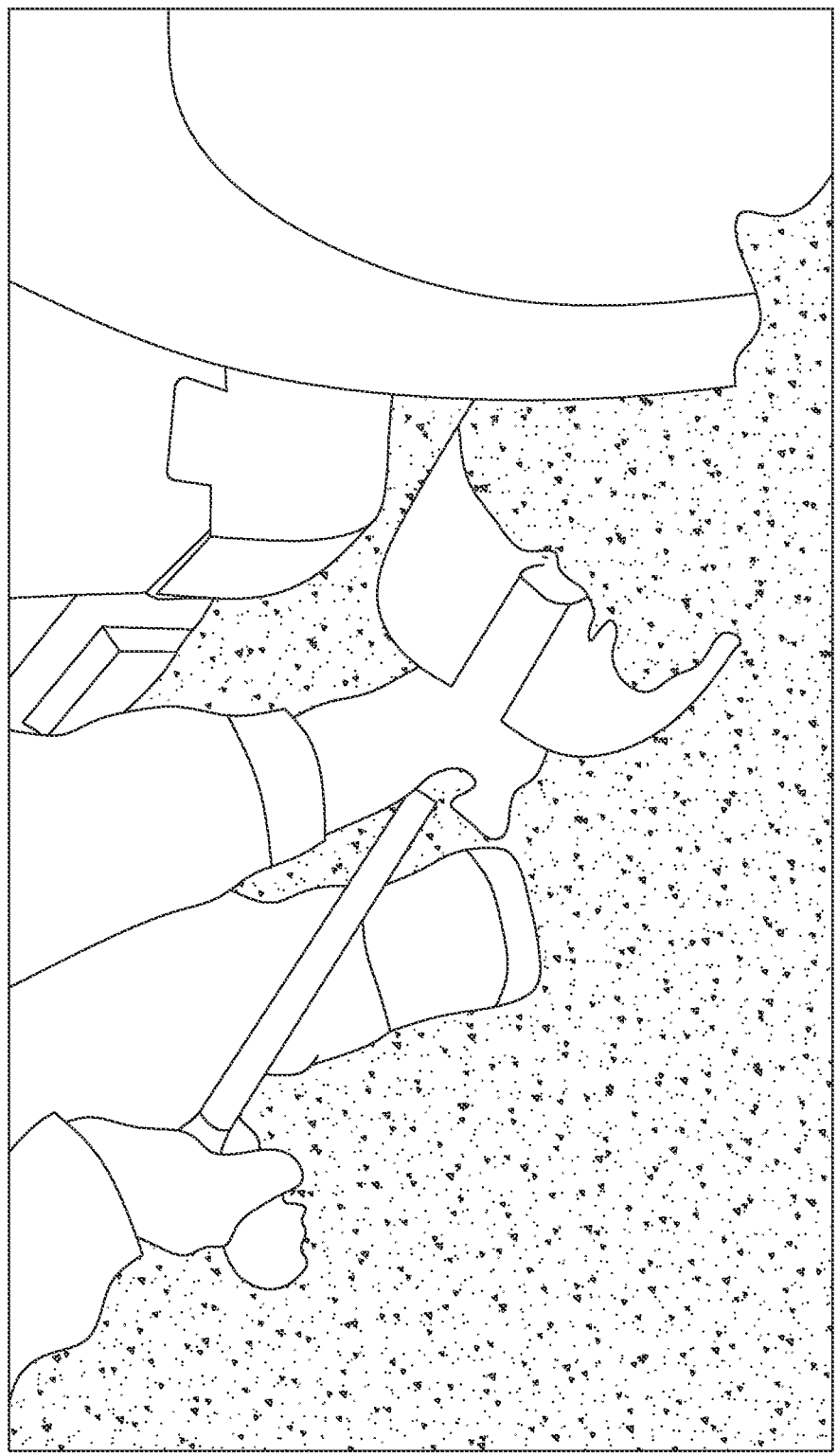

FIG. 9 shows an exemplary apparatus embodiment being used as a shovel, to remove snow from underneath a vehicle.

Figure 10:
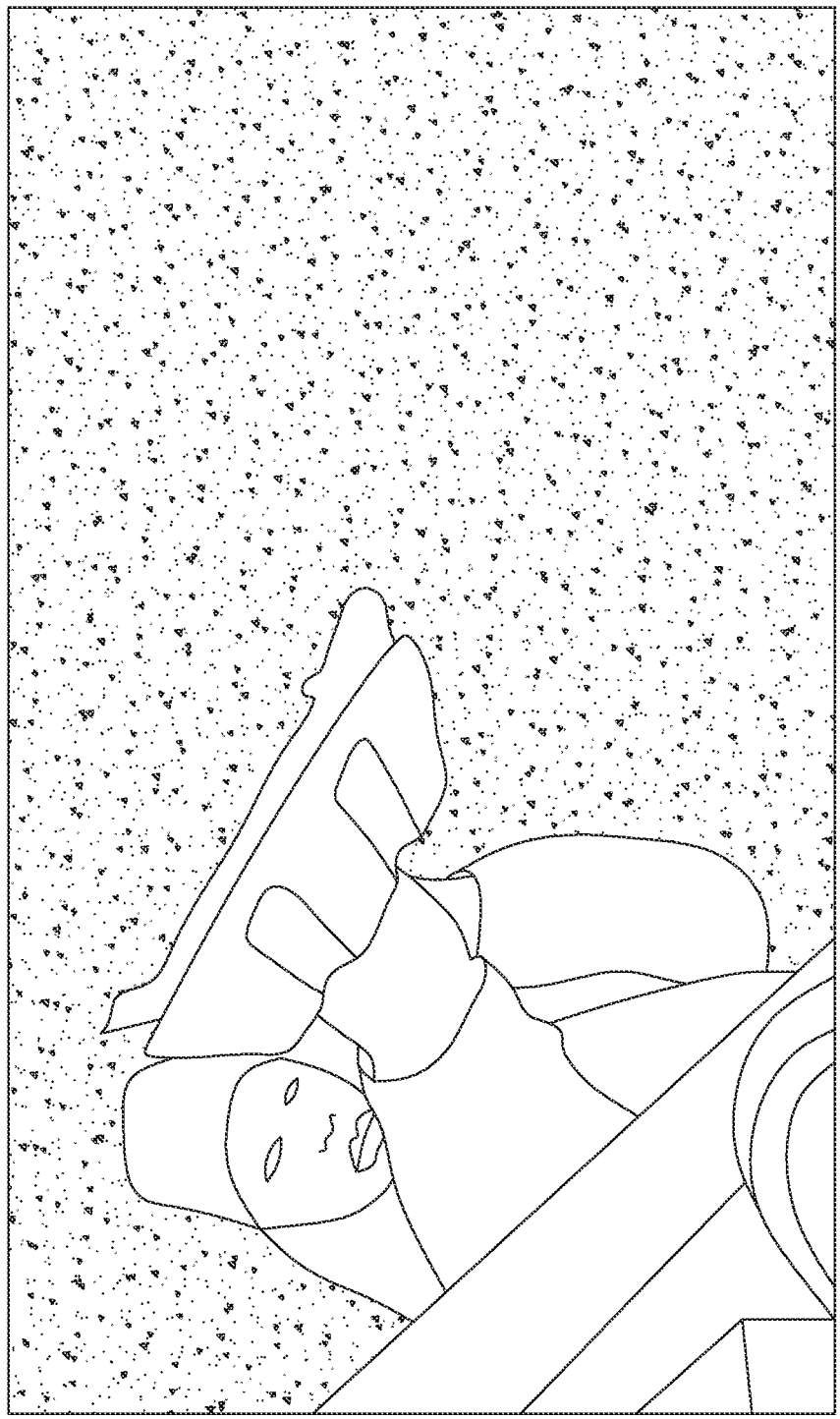

FIG. 10 shows an exemplary apparatus embodiment being used as a scraper, to remove ice or snow from a vehicle windshield.

Figure 11:
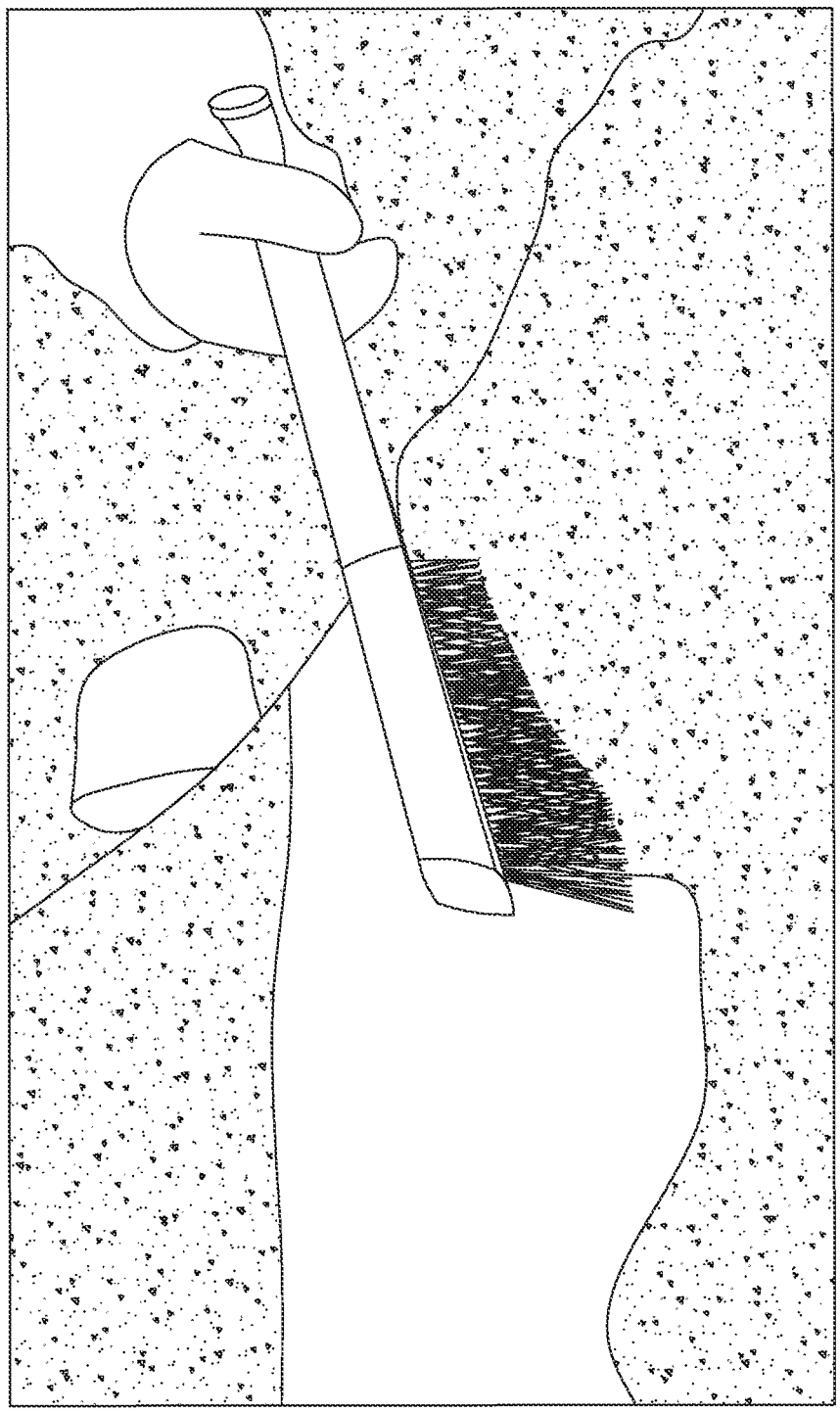

FIG. 11 shows an exemplary apparatus embodiment being used (with the brush removed from the shovel head) as a snow brush on a vehicle.

Figure 12:
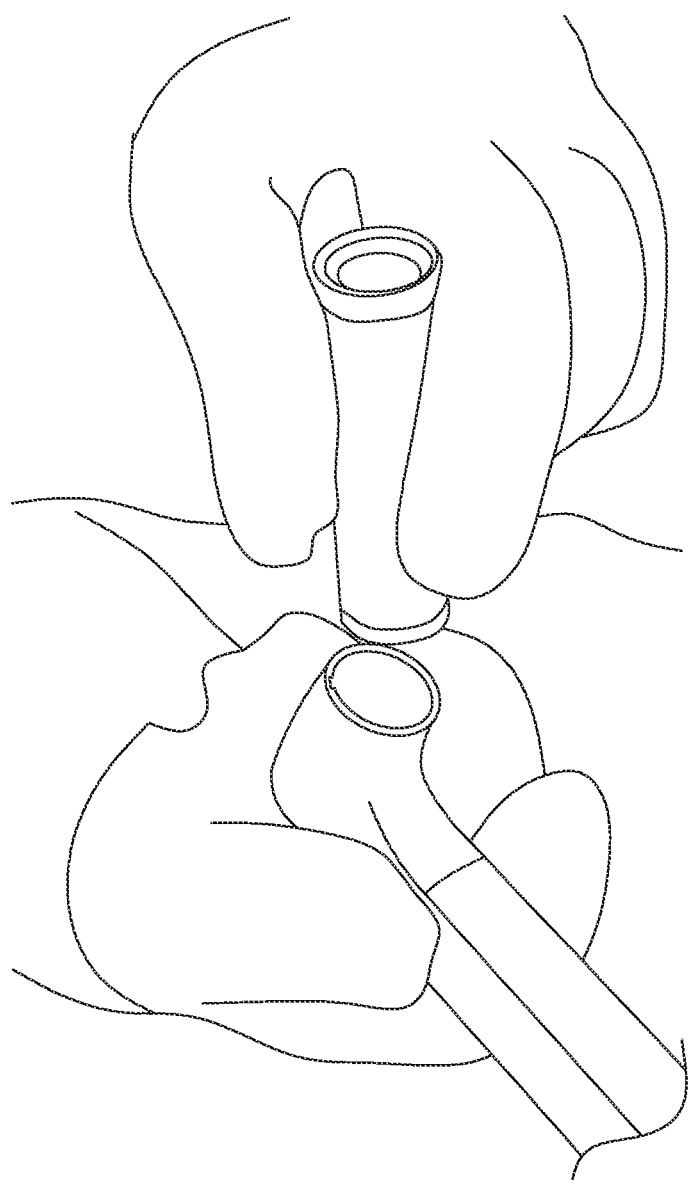

FIG. 12 shows an exemplary apparatus embodiment with a removable flashlight component being removed from the handle.

Figure 13:
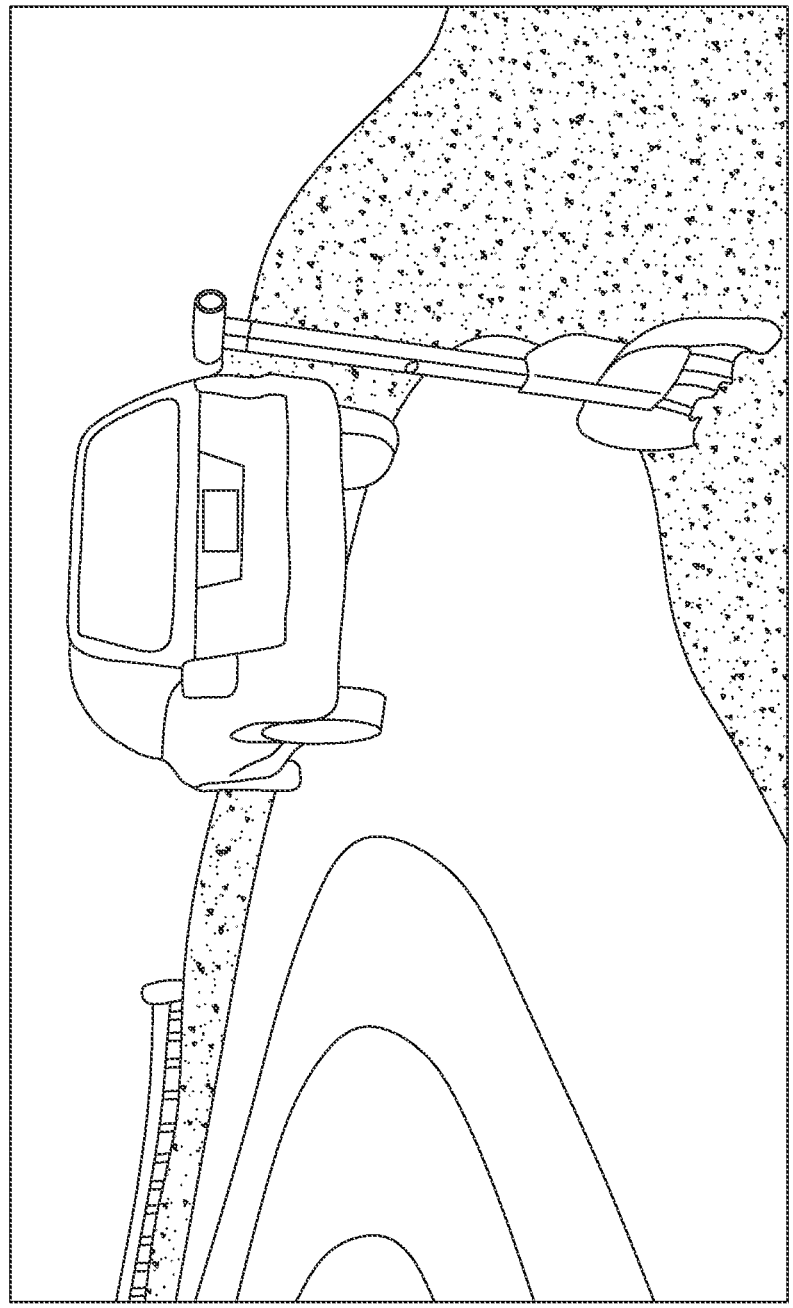

FIG. 13 shows an exemplary apparatus embodiment being used as a hazard warning device. In this usage, the LED flashlight (for example, with the red light blinking) may be used to signal other drivers of a roadside hazard.

Figure 14:
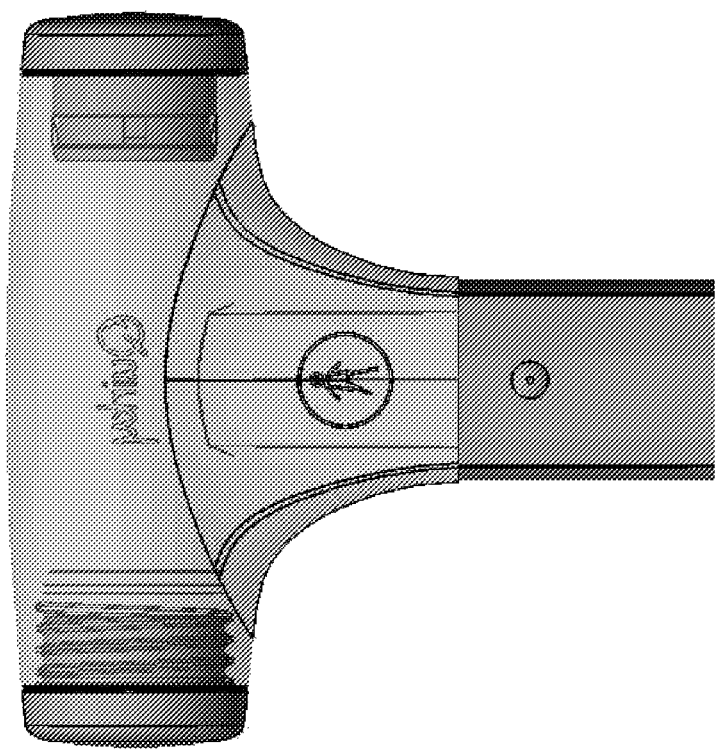
FIGS. 14 and 15 depict exemplary embodiments without flashlight components.
Figure 15:
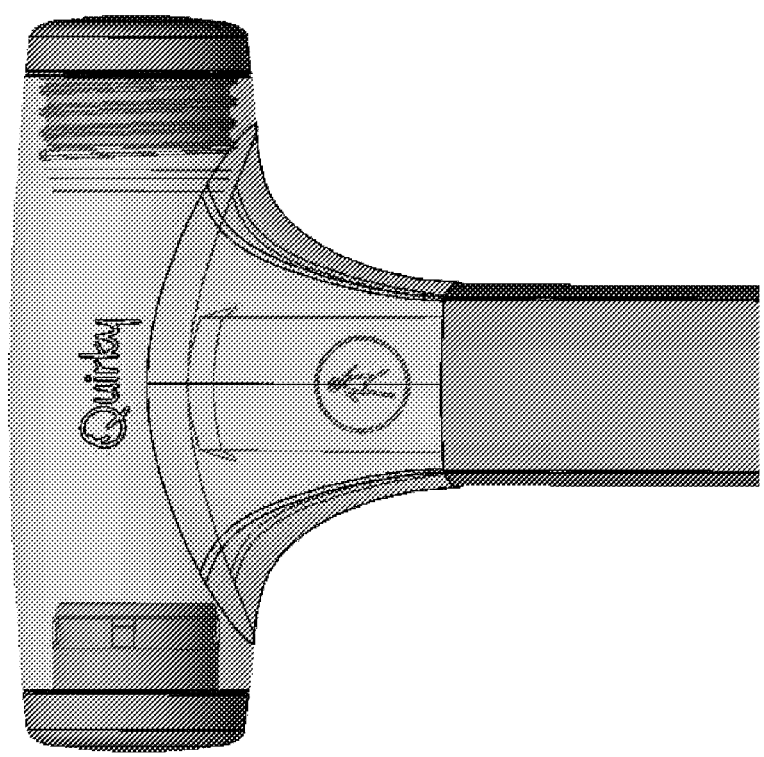
Figure 16:
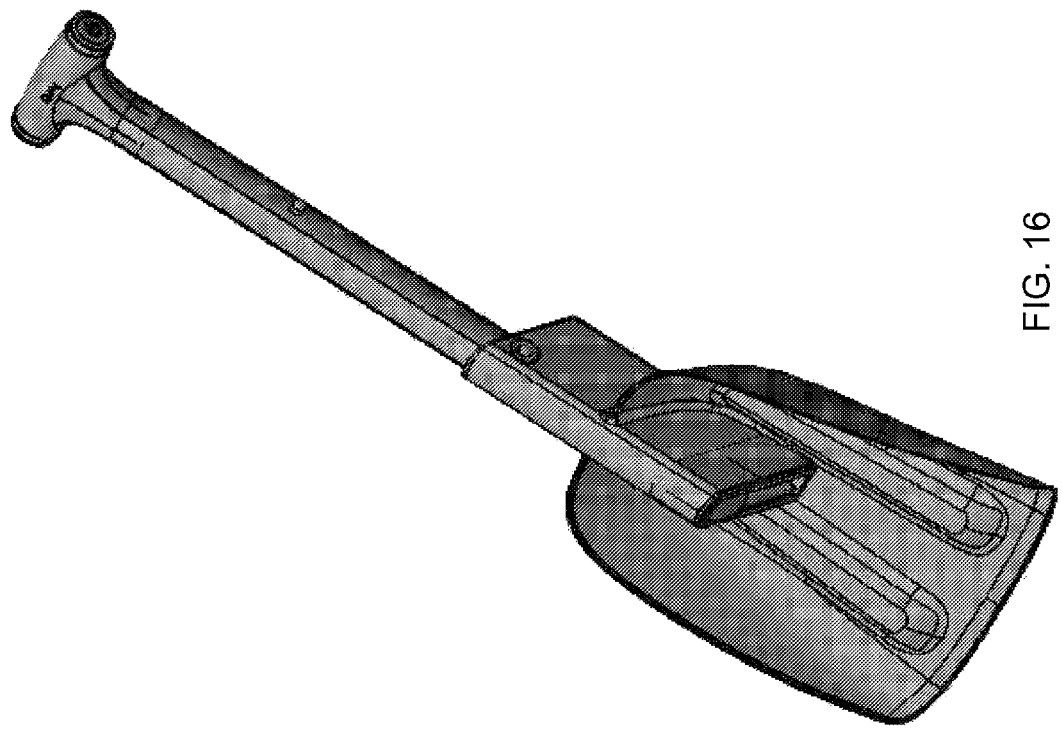
FIGS. 16-24 depict various perspectives of exemplary embodiments with no flashlight component.
Figure 17:
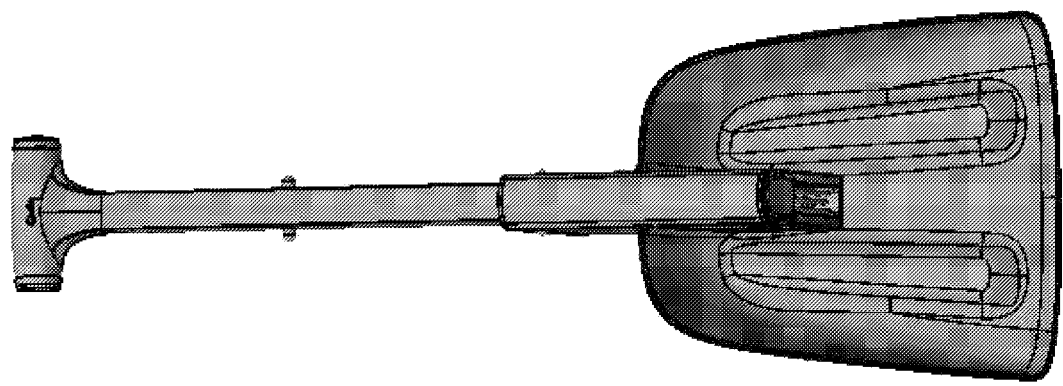
Figure 18:
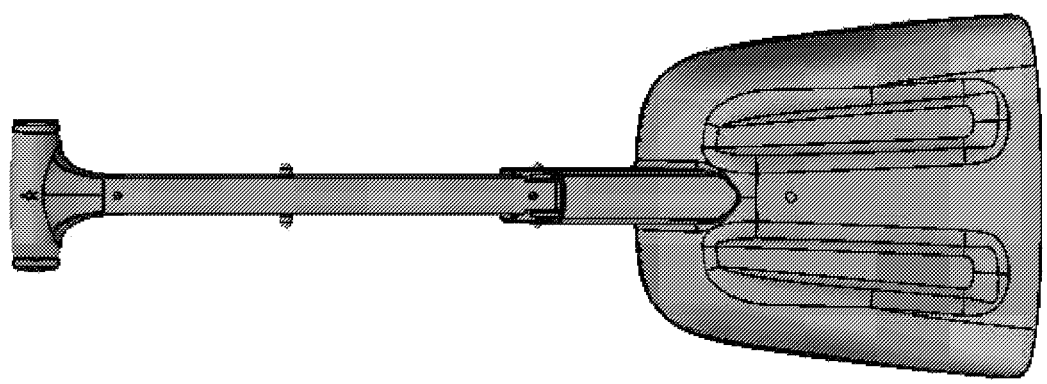
Figure 19:
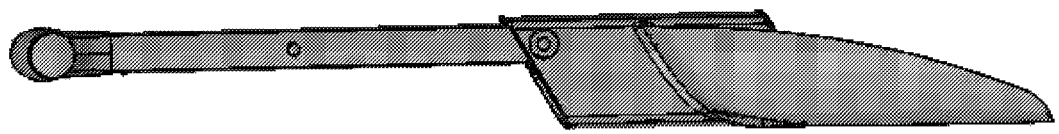
Figure 20:
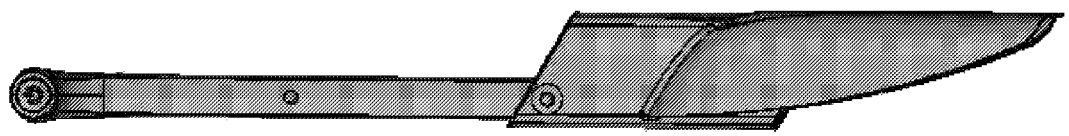
Figure 21:
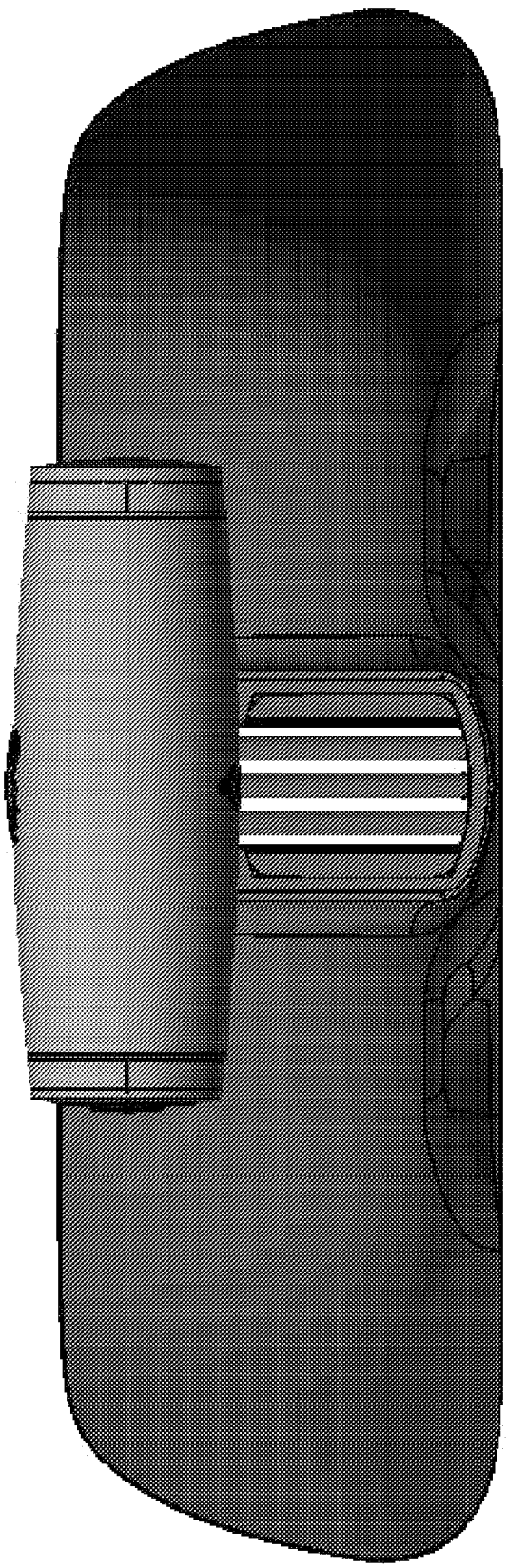
Figure 22:
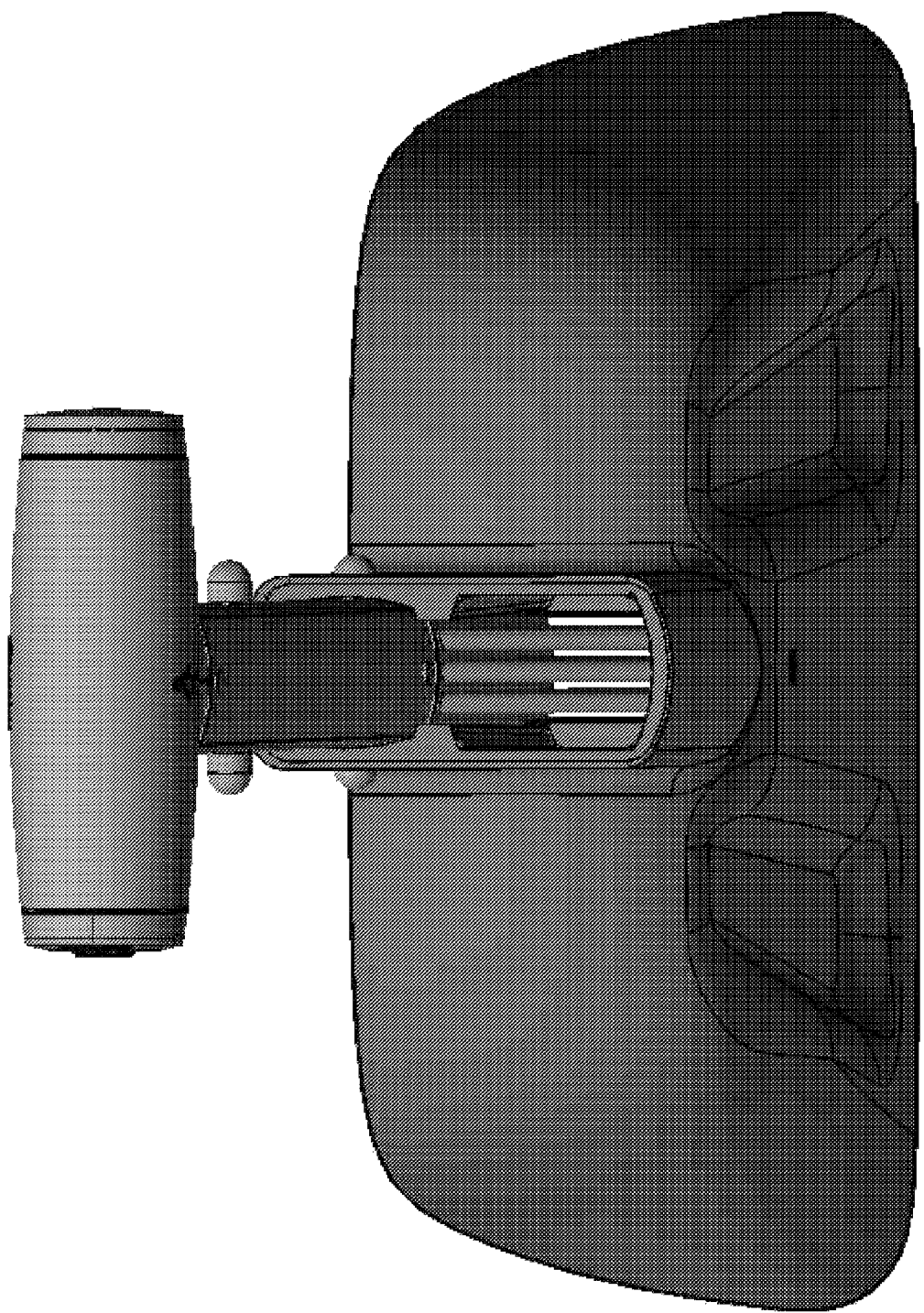
Figure 23:
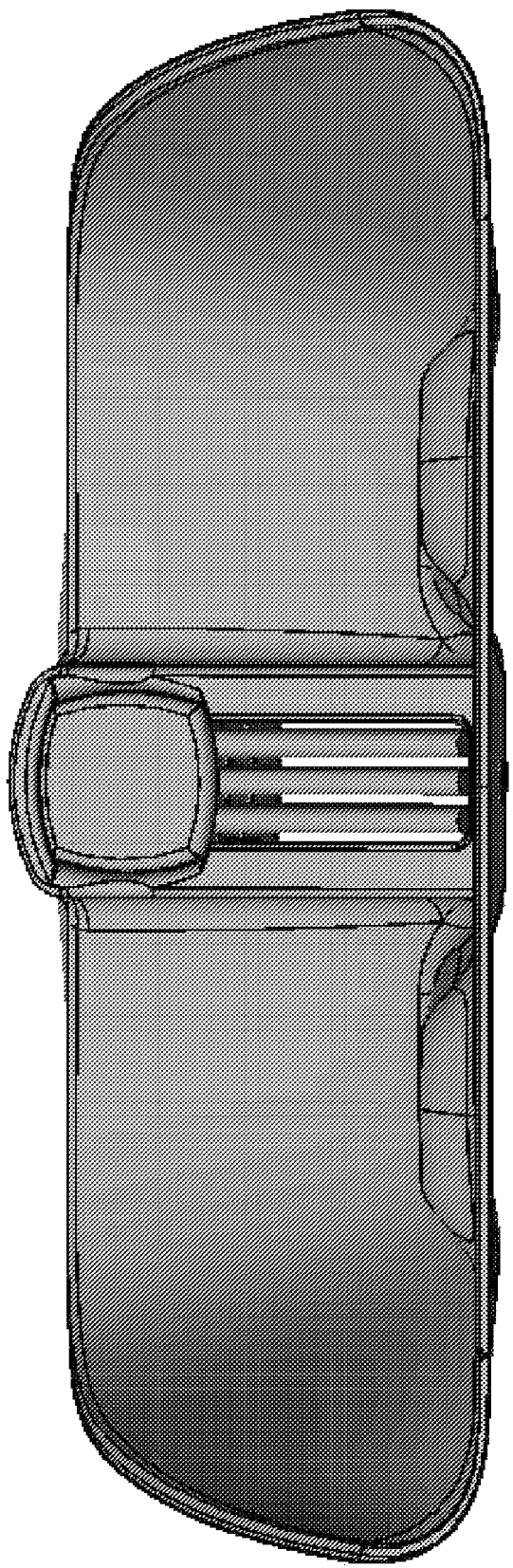
Figure 24:
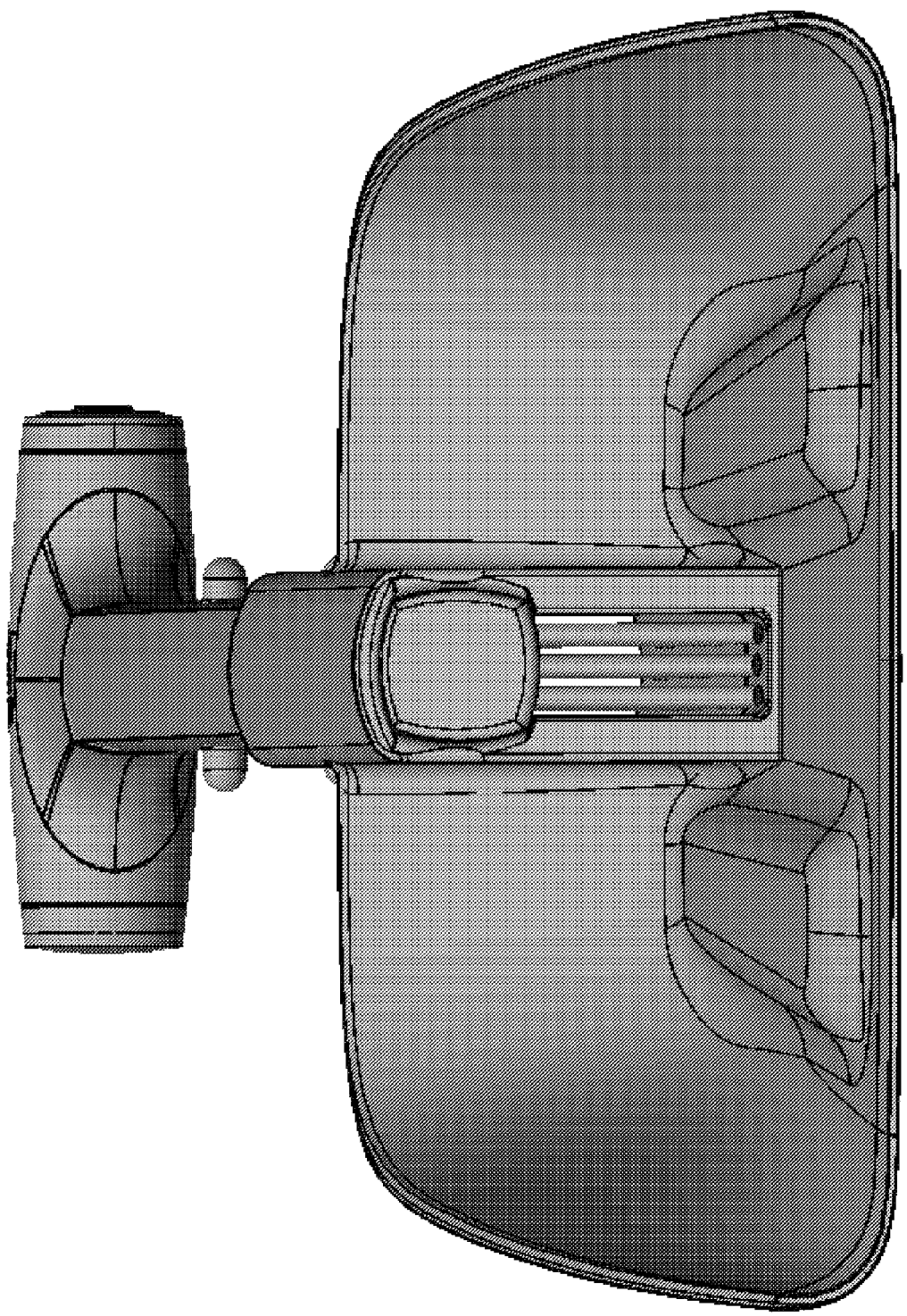

As shown in FIGS. 14 and 15, some exemplary embodiments may have, for example, reflector components in the handle, instead of flashlight components. Other embodiments may use handles with neither reflector nor flashlight components. When no flashlight component is used, related components such as battery housing (12) may likewise be omitted.

FIGS. 16-24 depict various perspectives of exemplary embodiments with no flashlight component. Those skilled in the art will understand that various connections may be used to attach the reflector(s) to the handle—for example, a screw connection, or a snap-in connection.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

For example, the cross-sectional shape of the bristle block shaft is not limited to that depicted in the drawings, and may be any shape that enables connection with a suitable shovel head. Also, a handle light source in exemplary embodiments may be of any suitable type, and is not limited to LED flashlights. The shaft may be anodized or powder coated.

We claim:

1. An apparatus comprising:
   a brush component comprising a handle on a first end of a shaft defining a longitudinal axis and a brush on a second end of said shaft; and
   a shovel component removably connected to said brush component;
   wherein said brush is at least partially enclosed within said shovel component when said shovel component is connected to said brush component,
   wherein said shovel component comprises an opening for slidably receiving said brush along said longitudinal axis, and
   wherein said brush is exposed when said shovel component is disconnected from said brush component.

2. An apparatus as in claim 1, wherein said handle comprises one or more reflectors.

3. An apparatus as in claim 1, wherein said handle comprises one or more flashlights.

4. An apparatus as in claim 3, wherein at least one of said one or more flashlights is removable.

5. An apparatus as in claim 3, wherein at least one of said one or more flashlights has a first mode in which a white light is activated, and a second mode in which a blinking red light is activated.

6. An apparatus as in claim 1, wherein said shaft has four convex sides.

7. An apparatus as in claim 1, wherein said shovel component comprises an opening configured to accept said shaft on three sides, and configured on a fourth side to accept said brush.

8. An apparatus as in claim 1, wherein said shaft comprises two or more collapsible components.

9. An apparatus as in claim 1, wherein said shovel component is removably connected to said brush component via one or more button pins.

10. A method of removing snow or ice comprising the steps of utilizing an apparatus comprising a brush component comprising a handle on a first end of a shaft defining a longitudinal axis and a brush on a second end of said shaft, and a shovel component removably connected to said brush component, wherein said brush is at least partially enclosed within said shovel component when said shovel component is connected to said brush component, and wherein said shovel component comprises an opening for slidably receiving said brush along said longitudinal axis, and wherein said brush is exposed when said shovel component is disconnected from said brush component; disconnecting said brush component from said shovel component; removing snow or ice using said brush; and reconnecting said brush component to said shovel component.

* * * * *